June 22, 1937. L. ROBACZYNSKI Re. 20,423
KNITTING MACHINE
Original Filed Sept. 13, 1935 2 Sheets-Sheet 1
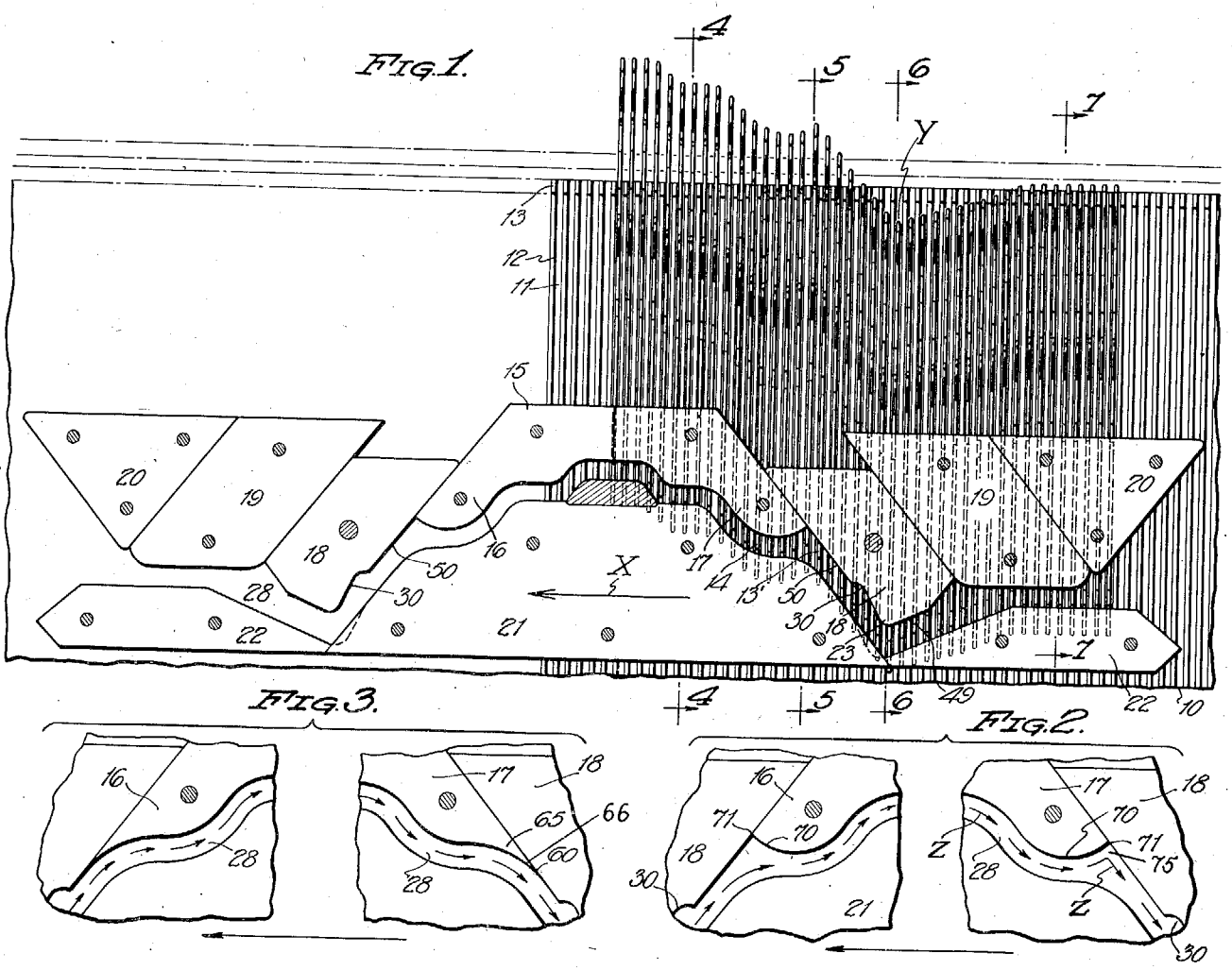
LADISLAUS ROBACZYNSKI.
INVENTOR.
WITNESS:
BY Ely Pattison
ATTORNEYS.

June 22, 1937. L. ROBACZYNSKI Re. 20,423

KNITTING MACHINE

Original Filed Sept. 13, 1935 2 Sheets-Sheet 2

LADISLAUS ROBACZYNSKI.
INVENTOR.

WITNESS:

BY Ely & Pattison.
ATTORNEYS.

Reissued June 22, 1937 Re. 20,423

UNITED STATES PATENT OFFICE 20,423

KNITTING MACHINE

Ladislaus Robaczynski, Brooklyn, N. Y.

Original No. 2,067,733, dated January 12, 1937, Serial No. 40,359, September 13, 1935. Application for reissue May 1, 1937, Serial No. 140,271

3 Claims. (Cl. 66—63)

This invention relates to knitting machines, and more particularly it pertains to new and useful improvements in the carriage of such machines.

In knitting machines of the type known as links and links, a carriage is reciprocated over the needle beds, and through the medium of cam plates or cam locks, as they are sometimes called, jacks are operated to in turn operate needles to perform the knitting operation.

The jacks and needles are reciprocated in grooves or channels formed in needle beds, which needle beds are so constructed that at their adjacent edges where the actual knitting operation is accomplished, there is a plurality of upstanding teeth known as comb teeth.

During the knitting operation and more particularly at the moment when the needles are "casting off" to form a stitch, the needle upon which the stitch is being formed has its free end retracted in the needle bed to a position to the rear of the comb teeth of the needle bed and the looser the fabric and longer the stitch, the greater the extent to which the needle is retracted relatively to the said comb teeth.

The cam plate systems of such machines include a stitch cam which operates the needles through the medium of the needle jacks to retract the needles to their casting off position, and this stitch cam is adjustable to determine the length of stitch as desired.

Where relatively long stitches are formed, the needles are retracted to a greater extent than is the case when relatively short stitches are formed, and in the retraction of the needle to a point sufficient to form the long stitches the yarn is pulled around the comb teeth of the needle bed under considerable strain, which ofttimes results in rupture of the yarn.

It is the object of the present invention to improve the construction and mode of operation of knitting machines and to provide such machines with a cam or lock mechanism which will effect a better knitting operation than prior machines.

A feature of the invention resides in a new and novel construction and arrangement of parts whereby the strain incident to the pulling of the yarn around the comb teeth in the formation of a so-called long or loose stitch, is relieved.

A further feature of the invention resides in a novel construction of stitch cam whereby the relief of the strain is accomplished upon opposite sides of the needle actually forming the stitch.

Still a further feature of the invention resides in a novel construction of bridge cam whereby the accomplishment of the objects desired may be obtained.

Other features of the invention relate to certain novel and improved constructions and arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings,

Figure 1 is a fragmentary plan view partly in horizontal section of a portion of a knitting machine carriage, illustrating in plan the several cam plates, the same being the front section of the carriage, Figure 2 is a fragmentary view partly in plan and partly in section illustrating the improved construction of bridge lock, the view being partly broken away, Figure 3 is a view similar to Figure 2, but illustrating the generally employed or conventional form of bridge cam, Figure 4 is a tranvserse sectional view taken substantially on the line 4—4 of Figure 1.

Figure 4:
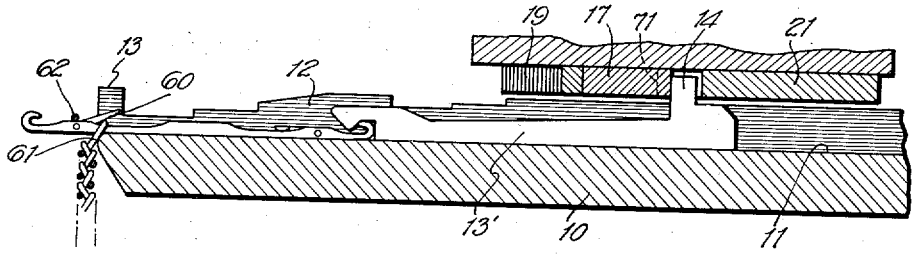

Referring to the drawings by reference character and particularly to Figure 1, the numeral 10 designates one of the needle beds of a knitting machine, in the present instance the needle bed illustrated being the front needle bed of a links and links knitting machine.

The needle bed is formed with grooves or channels 11 by the provision of ribs 12, and each rib terminates at its inner end in an upstanding lug or projection 13, commonly known in the art as a comb tooth.

The needles are herein illustrated as of the double latch type, are slidably mounted in the channels 11, and are operated therein by sinkers or jacks 13′ which have butts 14 which travel in a guideway or cam slot formed on the under face of the carriage by a plurality of cam blocks or plates which will now be described.

The reference numeral 15 designates the bridge cam which comprises a body portion having two projecting leg portions 16 and 17. At each end of the bridge block there is a cam plate 18 which is known as the stitch cam plate and beyond the stitch cam plates there are two cam plates 19 and 20 known as blind plates. These several plates cooperate with a center cam plate 21 and guide cam plates 22 to provide the channel 28 through which the butts of the sinkers or jacks travel properly to manipulate the needles to form the knitting stitches. The stitch cam plates are slidably mounted between their adjacent cam plates in order that they may be adjusted in the ordinary manner to form stitches of various sizes.

In the present instance the needle bed is assumed to be traveling in the direction of the arrow X in Figure 1, and when traveling in this direction, the stitch cam 18 upon the right hand side of Figure 1 is the cam plate, which by operation of the sinkers or jacks and needles produces the stitches to form the fabric. Each stitch cam plate 18 has a high spot 23, and it is when the butt 14 of the sinker or jack passes around this point of the cam plate 18 that the needle is withdrawn to its fullest extent as indicated at Y in Figure 1 to cast off the previously formed stitch and pull the new length of yarn through the previously formed stitch to form the new stitch.

By examination of Figure 1 it will be obvious that, as the needle is withdrawn to its fullest extent as at Y in said figure, the yarn which is looped around the two next adjacent needles on the left will be drawn around their respective comb teeth to the left of said needles and will be subjected to strain by this action.

The present invention, as one of its features, provides means for relieving this strain, and this means will now be described. The stitch cam 18 is provided with a cut out portion 30 in that edge adjacent the leg of the bridge cam, which cut out portion has an angularly disposed rear wall which merges into the high point 23 of the cam. This construction is clearly illustrated in said Figure 1. By this construction it will be apparent that as the butts of the sinkers or jacks engage the cam face 50 of the stitch cam 18, they will ride into the cut out portion 30, which will permit of them taking a slight movement transversely of the needle bed in Figure 1 in order that the needles immediately adjacent the needle which is forming the stitch, and immediately to the left thereof may, by this slight movement, relieve the strain of the yarn passing around the comb teeth immediately adjacent the needle upon which the stitch is actually being formed. The stitch plate 18 also has an angular face 49 which face 49 is disposed at a less acute angle than the effective face of the cam into which it merges thereby permitting of a slight transverse movement of the needles after the butts of the sinkers or jacks have passed the high point of the cam, thus relieving the strain upon the right hand side of the needle actually forming the stitch. Inasmuch as the movement of the carriage is continuous across the machine and the needles are successively operated, the strain will be relieved as the stitch is formed upon each needle.

Figure 5:
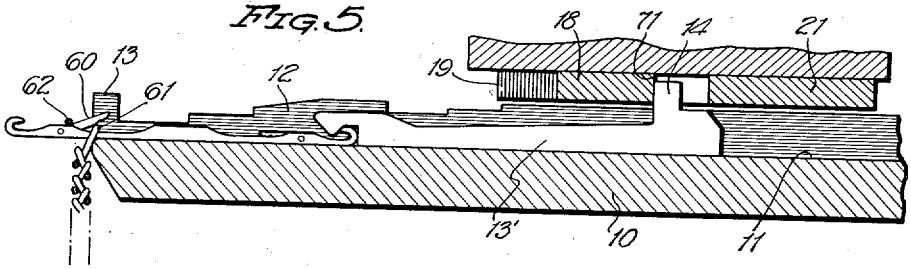
Figure 5 is a transverse sectional view taken substantially on the line 5—5 of Figure 1.
Figure 6:
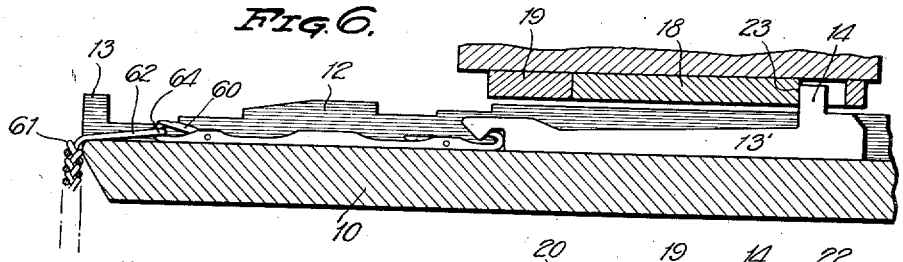
Figure 6 is a transverse sectional view taken substantially on the line 6—6 of Figure 1.
Figure 7:
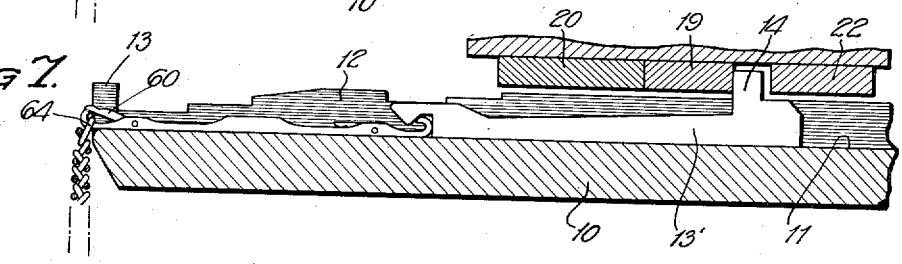
Figure 7 is a transverse sectional view taken substantially on the line 7—7 of Figure 1.

In Figures 4 to 7, I have illustrated the various positions which each needle assumes during a complete stitch forming operation. In Figure 4, the needle is illustrated with its latch 60 in open position and the previous formed loop or stitch designated 61 shown beneath the latch. The yarn 62 has been laid upon the top of the latch and the needle is about to be retracted to cause the loop 61 to close the needle latch 60 to retain the yarn 62 within the hooked end of the needle, after which the loop 61 will pass free of the needle to form a new stitch. In Figure 5 the starting of this operation is illustrated. In Figure 6 the loop 61 has been cast off and a new loop 64 has been formed from the yarn 62. In this position it will be noted that the new loop 64 is considerably longer than the loop 61 illustrated in Figures 4 and 5, and it is at this time that the yarn is subjected to the strain above mentioned by reason of its being drawn around the comb tooth 13. In Figure 7 the stitch has been formed and the needle moves back to its position of rest, in which position it remains until the next successive operation thereof to form another stitch.

It is a further feature of the invention to provide a new and improved form of bridge cam plate, and this new form is illustrated in Figure 2. Reference will first be had to Figure 3 in which it will be noted that the legs 16 and 17 of the bridge plate are each provided with an extension 65 which has a feather edge 66 merging into the adjacent edge of the stitch cam 18. This is the common or generally employed construction of bridge cam. In actual experience, however, I have found that the bridge cam plate wears at the point 60 due to continued engagement at this point of the sinker or jack butts and that such wear produces a shoulder which, even though ever so slight, interferes with free travel of the butts of the sinkers or jacks through the cam slot 28, and often results in total destruction of the jacks.

In Figure 2 I have illustrated the improved form of bridge cam plate which I have devised to obviate the above disadvantage. In said figure it will be noted that the legs 16 and 17 of the bridge cam plate are each provided with an abruptly rounded end 70, which terminates at an abrupt angle as at 71 at the adjacent side edge of the stitch plate 18. It will be noted that these points 71, where the legs of the bridge cam plate terminate or meet with the adjacent stitch cam plates, are forward of the rearmost portion of the legs of the bridge cam plate which construction provides an area 75 through which the sinker or jack butts may pass, the course which they take being illustrated by the arrows Z in said Figure 2. Constant contact of the sinker or jack butts with the bluntly rounded ends of the legs of the bridge cam will not produce a shoulder against which the butts of the sinkers or jacks can catch, and consequently they will move freely through the cam slot 28 without damage to themselves.

This last feature is particularly advantageous when the stitch cam plate is adjusted considerably forward of the position in which it is shown in Figure 1, in which position, the high point 23 in the old construction illustrated in Figure 3, is positioned relatively close to the point 60, which causes the sinkers or jacks to jam unless this particular wall formed by the juncture of the bridge cam plate with the stitch cam plate is perfectly smooth and uninterrupted.

From the foregoing it will be apparent that the present invention provides a new and improved form of cam system for knitting machines in which the yarn during the knitting operation is not subjected to strain by pulling the same around the comb teeth of the needle bed, and in which the likelihood of jamming of the sinkers or jacks is entirely obviated.

Having thus described the invention, what is claimed as new, is:

1. In a cam system for knitting machine carriages, a bridge cam comprising a main body portion and leg portions extending therefrom, said leg portions having straight angularly disposed outer edges, and a stitch cam cooperating with each leg portion of the bridge cam and having sliding engagement with the straight outer edge thereof, the inner edge and end of each leg of the bridge cam being curved with the curve terminating abruptly at the straight edge of its respective leg of the bridge cam at a point forward of the rearmost portion of the leg of the bridge cam.

2. In a cam system for knitting machine carriages, a bridge cam, leg portions extending from said bridge cam, a stitch cam cooperating with each of the legs of the bridge cam and adjustable within certain limitations relative to its respective leg of the bridge cam, and a rounded portion forming the end of each of the legs of the bridge cam, said rounded portion extending to a point in advance of the rearmost portion of the leg of the bridge cam and terminating abruptly where it meets its respective stitch cam.

3. In a cam system for knitting machine carriages, a bridge cam comprising a main body portion, leg portions extending from said bridge cam, a stitch cam cooperating with each of the legs of the bridge cam and having sliding engagement therewith whereby each stitch cam is adjustable relatively to its respective leg of the bridge cam, and a curved edge on the end of each of the leg portions of the bridge cam, the curve of the curved portion extending to a point in advance of the rearmost portion of the bridge cam and being disposed at an abrupt angle to the adjacent edge of its respective stitch cam.

LADISLAUS ROBACZYNSKI.